United States Patent
Srivastava et al.

(10) Patent No.: US 12,124,347 B2
(45) Date of Patent: Oct. 22, 2024

(54) SYSTEM AND METHOD FOR MANAGING SECURE MEMORIES IN INTEGRATED CIRCUITS

(71) Applicant: NXP B.V., Eindhoven (NL)

(72) Inventors: Neha Srivastava, New Delhi (IN); Gautam Tikoo, Noida (IN); Harshit Saxena, Faizabad (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/152,797

(22) Filed: Jan. 11, 2023

(65) Prior Publication Data

US 2024/0160545 A1 May 16, 2024

(30) Foreign Application Priority Data

Nov. 15, 2022 (IN) .............................. 202221065262

(51) Int. Cl.
*G06F 11/27* (2006.01)
*G06F 12/14* (2006.01)

(52) U.S. Cl.
CPC .............. *G06F 11/27* (2013.01); *G06F 12/14* (2013.01); *G06F 2212/1052* (2013.01)

(58) Field of Classification Search
CPC ... G06F 11/27; G06F 12/14; G06F 2212/1052
USPC ........................................................ 714/718
See application file for complete search history.

(56) References Cited

U.S. PATENT DOCUMENTS

| | | | |
|---|---|---|---|
| 8,769,355 | B2 | 7/2014 | Scott et al. |
| 8,781,111 | B2 | 7/2014 | Qi et al. |
| 10,628,249 | B2 | 4/2020 | Sere et al. |
| 10,878,099 | B2 | 12/2020 | Wu et al. |
| 10,990,682 | B2 | 4/2021 | Margalit |
| 11,175,340 | B1 | 11/2021 | Srivastava et al. |
| 11,188,407 | B1 * | 11/2021 | Swanson .............. G06F 11/1435 |
| 2005/0157565 | A1 * | 7/2005 | Lee ........................ G11C 29/26 365/189.05 |
| 2010/0107010 | A1 | 4/2010 | Warnes et al. |
| 2010/0235691 | A1 * | 9/2010 | Chen ...................... G11C 29/14 714/E11.169 |
| 2011/0289349 | A1 * | 11/2011 | Loeser ................... G11C 29/08 714/6.24 |
| 2014/0189450 | A1 * | 7/2014 | Varadarajan ....... G11C 29/4401 714/718 |
| 2017/0141912 | A1 | 5/2017 | Cech et al. |
| 2017/0344313 | A1 * | 11/2017 | Hayasaka ................. G06F 3/08 |
| 2018/0286491 | A1 | 10/2018 | Arsovski et al. |

(Continued)

*Primary Examiner* — James C Kerveros

(57) ABSTRACT

An integrated circuit (IC) includes first and second secure memory elements storing identical data and a memory management system that executes a memory operation on the first secure memory element and a control operation on the second secure memory element simultaneously. The control operation is associated with safety of the IC and is executed to enable error detection in the second secure memory element, fault injection for the second secure memory element, masking of a power profile associated with the memory operation, or a combination thereof. After the execution of the memory operation and the control operation, the memory management system copies the data of the first secure memory element to the second secure memory element to maintain sanity of the second secure memory element.

20 Claims, 7 Drawing Sheets

(56) References Cited

U.S. PATENT DOCUMENTS

| | | |
|---|---|---|
| 2019/0121556 A1 | 4/2019 | Tran et al. |
| 2019/0172547 A1* | 6/2019 | Yun ........................ G11C 29/36 |
| 2022/0254437 A1* | 8/2022 | Chang ................ G11C 29/4401 |

* cited by examiner

SYSTEM AND METHOD FOR MANAGING SECURE MEMORIES IN INTEGRATED CIRCUITS

FIELD OF THE DISCLOSURE

The present disclosure relates generally to electronic circuits, and, more particularly, to a system and a method for managing secure memories in integrated circuits.

BACKGROUND

An integrated circuit (IC) typically includes a secure memory that stores security-related data (e.g., cryptographic keys), and various memory operations are executed thereon to access the security-related data. Such security-related data is critical for the security of the IC. Inefficient management of the secure memory (e.g., undetected errors, exposure to attacks, or the like) may corrupt the secure memory and compromise the security of the IC.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION OF EMBODIMENTS

Figure 1:
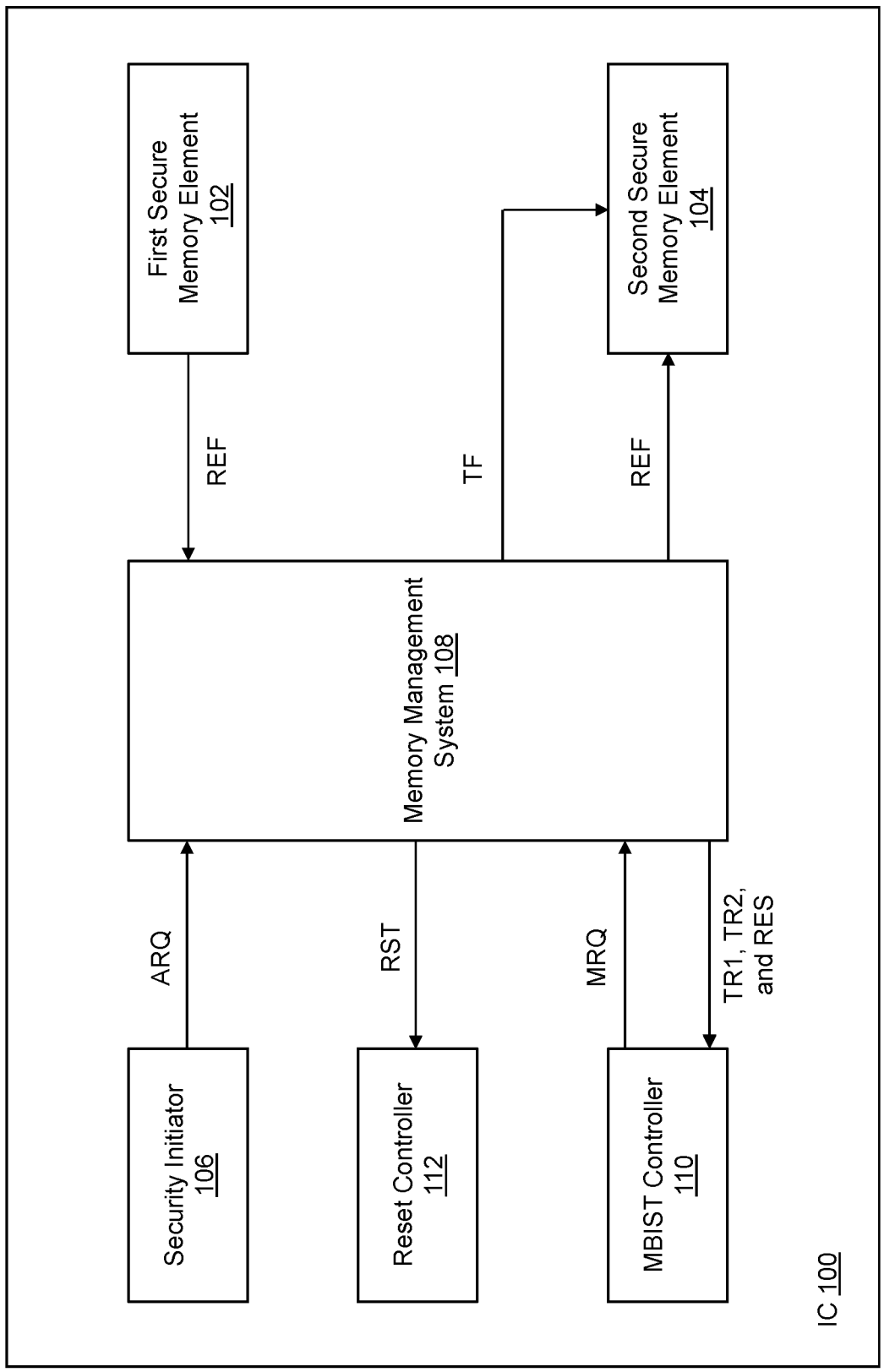
FIG. 1 illustrates a schematic block diagram of an integrated circuit (IC) in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, an integrated circuit (IC) is disclosed. The IC may include a first secure memory element, a second secure memory element, and a memory management system that may be coupled to the first and second secure memory elements. The first and second secure memory elements may be configured to store identical data. The memory management system may be configured to execute a first memory operation on the first secure memory element. Further, while the first memory operation is being executed on the first secure memory element, the memory management system may be configured to execute a control operation on the second secure memory element. The control operation may be associated with safety of the IC. The memory management system may be further configured to copy, after the execution of the first memory operation and the control operation, the data of the first secure memory element to the second secure memory element.

In another embodiment of the present disclosure, a secure memory management method is disclosed. The secure memory management method may include executing a first memory operation on a first secure memory element by a memory management system. The method may further include executing, while the first memory operation is being executed on the first secure memory element, a control operation on the second secure memory element by the memory management system. Identical data is stored in the first and second secure memory elements. The control operation may be associated with safety of the IC. The secure memory management method may further include copying, after the execution of the first memory operation and the control operation, the data of the first secure memory element to the second secure memory element by the memory management system.

In some embodiments, the control operation may be associated with safety of the IC such that at least one of a group consisting of error detection in the second secure memory element, fault injection for the second secure memory element, and masking of a power profile associated with the first memory operation is enabled based on the control operation.

In some embodiments, the control operation may correspond to one of a group consisting of a memory built-in self-test (MBIST) operation, a fault injection operation, and a dummy operation. The MBIST operation may enable the error detection in the second secure memory element and mask the power profile associated with the first memory operation. The fault injection operation may enable the fault injection for the second secure memory element. Further, the dummy operation may enable the masking of the power profile associated with the first memory operation.

In some embodiments, the memory management system may be further configured to receive an MBIST request for the MBIST operation on the second secure memory element and validate the MBIST request. The MBIST operation may be executed on the second secure memory element based on the validation of the MBIST request.

In some embodiments, the IC may further include an MBIST controller that may be coupled to the memory management system. The MBIST controller may be configured to generate the MBIST request to initiate the MBIST operation on the second secure memory element and provide the MBIST request to the memory management system. Based on the execution of the MBIST operation, the memory management system may be further configured to provide result data, indicative of a result of the MBIST operation, to the MBIST controller.

In some embodiments, the memory management system may be further configured to determine whether the MBIST operation is required for the second secure memory element based on an operational state of the IC when the MBIST request is received. The MBIST request may be validated based on the determination that the MBIST operation is required for the second secure memory element.

In some embodiments, the memory management system may include a memory controller that may be coupled to the first secure memory element, a security circuit that may be coupled to the second secure memory element, and a duplication circuit that may be coupled to the first and second secure memory elements. The memory controller may be configured to execute the first memory operation on the first secure memory element. The security circuit may be configured to receive the MBIST request, validate the MBIST request, and execute, based on the validation of the MBIST request, the MBIST operation on the second secure memory element. The security circuit may execute the MBIST operation on the second secure memory element while the memory controller is executing the first memory operation on the first secure memory element. Further, after the execution of the MBIST operation and the first memory operation, the duplication circuit may be configured to copy the data of the first secure memory element to the second secure memory element.

In some embodiments, the memory controller may be further coupled to the second secure memory element and the security circuit. The memory controller may be further configured to execute a second memory operation on the first and second secure memory elements. The MBIST request may be received by the security circuit while the memory controller is executing the second memory operation. Further, the security circuit may execute the MBIST operation on the second secure memory element after the second memory operation is executed. After the second memory operation is executed, the memory controller may be further configured to receive, from the security circuit, a halt request that is indicative of the execution of the MBIST operation on the second secure memory element. The memory controller may execute the first memory operation exclusively on the first secure memory element based on the halt request.

In some embodiments, the memory controller may be configured to detect a fault associated with the second secure memory element and determine whether the fault corresponds to one of a group consisting of a transient fault and a permanent fault. Based on the fault corresponding to the transient fault, the memory controller may be further configured to execute a third memory operation on the first and second secure memory elements. Further, based on the fault corresponding to the permanent fault, the memory controller may be configured to disable the second secure memory element and execute the third memory operation exclusively on the first secure memory element.

In some embodiments, the memory controller may be further configured to generate a trigger signal for triggering the MBIST operation on the second secure memory element. Further, the memory controller may determine whether the fault corresponds to one of the group consisting of the transient fault and the permanent fault based on a result of the MBIST operation.

In some embodiments, the memory controller may be further configured to determine a count associated with the fault and compare the count with a set of threshold ranges. The count is incremented for each detection. Each threshold range is indicative of a severity level associated with the fault. Based on the comparison between the count and the set of threshold ranges, the memory controller may be further configured to determine a recovery operation for the fault.

In some embodiments, the memory management system may include a shuffler that may be configured to generate a trigger signal for triggering the MBIST operation on the second secure memory element. The power profile associated with the first memory operation being executed on the first secure memory element may be masked based on the execution of the MBIST operation on the second secure memory element.

In some embodiments, to execute the fault injection operation, the memory management system may be further configured to inject a fault in the second secure memory element, execute a fourth memory operation on the second secure memory element, and determine whether the injected fault is detected. When the injected fault is detected, a recovery operation for the injected fault may be disabled.

In some embodiments, the memory management system may include a fault injector that may be coupled to the second secure memory element, a memory controller that may be coupled to the fault injector and the first and second secure memory elements, and a duplication circuit that may be coupled to the first and second secure memory elements. The fault injector may be configured to inject the fault in the second secure memory element. Further, the memory controller may be configured to execute the first memory operation on the first secure memory element. While the first memory operation is being executed on the first secure memory element, the memory controller may be further configured to execute the fourth memory operation on the second secure memory element and determine whether the injected fault is detected. After the execution of the fault injection operation and the first memory operation, the duplication circuit may be configured to copy the data of the first secure memory element to the second secure memory element.

In some embodiments, the memory controller may be configured to execute the first memory operation on the first secure memory element. While the first memory operation is being executed on the first secure memory element, the memory controller may be further configured to execute the dummy operation on the second secure memory element to mask the power profile associated with the first memory operation. The dummy operation may correspond to one of a group consisting of a read access operation and a write access operation.

In some embodiments, the shuffler may be configured to generate a trigger signal for triggering the dummy operation and provide the trigger signal to the memory controller. The memory controller may execute the dummy operation based on the trigger signal.

In some embodiments, the memory controller may be configured to execute the first memory operation on the first secure memory element. While the first memory operation is being executed on the first secure memory element, the duplication circuit may be configured to copy the data of the first secure memory element to the second secure memory element to mask the power profile associated with the first memory operation. Further, the copying of the data of the first secure memory element to the second secure memory element may correspond to the dummy operation.

In some embodiments, the shuffler may be configured to generate a trigger signal for triggering the dummy operation on the second secure memory element and provide the trigger signal to the duplication circuit. The duplication circuit may copy the data of the first secure memory element to the second secure memory element based on the trigger signal.

In some embodiments, the data stored in the first secure memory element may be divided into a plurality of slices. The memory management system may copy the data of the first secure memory element to the second secure memory element such that one slice of the plurality of slices is copied at a time instance.

Overview:

Conventionally, to manage a secure memory, a memory management system may be utilized. The memory management system may execute a memory built-in self-test (MBIST) operation on the secure memory to test the secure memory (e.g., check for physical deformities in the secure memory). Various recovery operations may be executed based on a result of the MBIST operation. However, when the MBIST operation is being executed, memory operations of the secure memory are required to be halted. Additionally, after the MBIST operation is executed, the secure memory is required to be reset to maintain sanity thereof. Both the aforementioned scenarios result in significant downtime for the memory operations. Further, while the secure memory is tested for errors, the secure memory remains susceptible to various attacks. For example, the MBIST operation may be utilized to introduce a denial-of-service attack on the secure memory, the memory operations may be susceptible to a side-channel attack, or both. As a result, the security of an integrated circuit (IC) including the secure memory remains degraded. Further, if the memory management system detects a real-time fault (e.g., an error correction code (ECC) fault), the secure memory is typically required to be reset as a default brute-force response. This leads to additional downtime for the memory operations. Further, the fault-detection functionality of the memory management system remains untested, thereby rendering the memory management system unreliable.

Various embodiments of the present disclosure disclose an IC that includes first and second secure memory elements and a memory management system that may be coupled to the first and second secure memory elements. The first and second secure memory elements store identical data. The memory management system may execute a memory operation on the first secure memory element and a control operation on the second secure memory element in a simultaneous manner. The control operation is executed to enable error detection in the second secure memory element, fault injection for the second secure memory element, masking of a power profile associated with the memory operation, or a combination thereof. The control operation may thus correspond to a memory built-in self-test (MBIST) operation that enables the error detection in the second secure memory element and masks the power profile associated with the memory operation. Alternatively, the control operation may correspond to a fault injection operation that enables the fault injection for the second secure memory element or a dummy operation that enables the masking of the power profile associated with the memory operation. After the execution of the memory operation and the control operation, the memory management system may copy the data of the first secure memory element to the second secure memory element to maintain sanity of the second secure memory element.

Thus, in the present disclosure, when the control operation is to be executed, memory operation execution is not halted. Additionally, after the control operation, the sanity of the memory element is maintained. As a result, the downtime for the memory operations in the memory management system of the present disclosure is significantly less than that in a conventional memory management system. Further, the MBIST operation is executed exclusively after validation. As a result, a denial-of-service attack, by way of the MBIST operation, on the secure memory element of the present disclosure is prevented. Additionally, the power profile associated with the memory operation is masked using the MBIST operation or the dummy operation to mitigate side-channel attacks. The security of the IC including the memory management system of the present disclosure is thus significantly greater than that of an IC including the conventional memory management system. Further, in the memory management system of the present disclosure, for a real-time fault, a recovery operation is determined based on the severity of the fault instead of utilizing an IC reset as the default response. This further reduces the downtime for the memory operations. Additionally, the fault-detection functionality of the memory management system of the present disclosure is tested by way of the fault injection operation. Thus, the reliability of the memory management system of the present disclosure is significantly greater than that of the conventional memory management system.

FIG. 1 illustrates a schematic block diagram of an integrated circuit (IC) 100 in accordance with an embodiment of the present disclosure. The IC 100 may include a first secure memory element 102, a second secure memory element 104, a security initiator 106, a memory management system 108, a memory built-in self-test (MBIST) controller 110, and a reset controller 112. The IC 100 may be utilized in various applications such as an automotive device, a networking device, an image processing device, or the like.

The first and second secure memory elements 102 and 104 may include suitable circuitry that may be configured to perform one or more operations. For example, the first and second secure memory elements 102 and 104 may be configured to store security-related data (e.g., cryptographic keys). The security-related data may be utilized by security components (e.g., the security initiator 106) of the IC 100 to execute various security operations. In an embodiment, the first and second secure memory elements 102 and 104 correspond to separate secure memories. In another embodiment, the first and second secure memory elements 102 and 104 are part of the same secure memory. Each of the first and second secure memory elements 102 and 104 may be configured to store reference data REF. In other words, the first and second secure memory elements 102 and 104 may be configured to store identical data. In an embodiment, identical operations may be performed on the first and second secure memory elements 102 and 104 to ensure that the first and second secure memory elements 102 and 104 store identical data. Examples of the first and second secure memory elements 102 and 104 may include a random access memory, a flash memory, or the like.

The security initiator 106 may include suitable circuitry that may be configured to perform one or more operations. For example, the security initiator 106 may be configured to initiate various memory operations for execution on a secure memory element (e.g., at least one of the first and second secure memory elements 102 and 104) to access the security-related data stored therein, and execute various security operations based on the accessed data. For the sake of ongoing discussion, it is assumed that the security initiator 106 may initiate first through third memory operations in a sequential manner. The security initiator 106 may be further configured to generate an access request ARQ indicative of the first through third memory operations. Each of the first through third memory operations may correspond to a write operation, a read operation, an erase operation, or the like.

The memory management system 108 may be coupled to the first and second secure memory elements 102 and 104 and the security initiator 106. The memory management system 108 may be configured to receive the access request ARQ from the security initiator 106. The access request ARQ may be indicative of the first through third memory operations that are to be executed in the sequential manner on either the first secure memory element 102, the second secure memory element 104, or both. Based on the access request ARQ, the memory management system 108 may be further configured to execute the first memory operation on the first and second secure memory elements 102 and 104. As the same memory operation is being executed on the first and second secure memory elements 102 and 104, the data stored therein (e.g., the reference data REF) remains identical. The first memory operation may be executed on both the first and second secure memory elements 102 and 104 in a delayed manner to mask the power profile associated therewith.

While the first memory operation is being executed, a control operation may be triggered for one of the first and second secure memory elements 102 and 104. For the sake of ongoing discussion, it is assumed that the control operation may be triggered for the second secure memory element 104. As the control operation is triggered while the first memory operation is ongoing, the memory management system 108 may be configured to wait until the first memory operation is executed. After the execution of the first memory operation, the memory management system 108 may be further configured to execute the second memory operation exclusively on the first secure memory element 102, and the control operation on the second secure memory element 104.

The control operation is associated with safety of the IC 100. For example, the control operation is triggered to enable error detection in the second secure memory element 104, fault injection for the second secure memory element 104, masking of a power profile associated with memory operations being executed on the first secure memory element 102, or a combination thereof. The error detection in a secure memory element (e.g., the second secure memory element 104) corresponds to testing the secure memory element and if any errors are detected, various recovery operations may be executed. Further, the fault injection for a secure memory element (e.g., the second secure memory element 104) corresponds to testing the fault-detection functionality of the memory management system 108. Additionally, side-channel attacks in the IC 100 are mitigated based on the masking of the power profile associated with the memory operations. The execution of the control operation thus enhances the safety of the IC 100.

The control operation may thus correspond to an MBIST operation, a fault injection operation, or a dummy operation. The MBIST operation enables the error detection in the second secure memory element 104 and masks the power profile associated with the memory operations being executed on the first secure memory element 102. Further, the fault injection operation enables the fault injection for the second secure memory element 104, and the dummy operation enables the masking of the power profile associated with the memory operations being executed on the first secure memory element 102.

MBIST Operation:

When the control operation corresponds to the MBIST operation, the memory management system 108 may be further configured to receive an MBIST request MRQ to initiate the MBIST operation on the second secure memory element 104. The memory management system 108 may be further coupled to the MBIST controller 110. The MBIST controller 110 may include suitable circuitry that may be configured to perform one or more operations. For example, the MBIST controller 110 may be configured to generate the MBIST request MRQ and provide the MBIST request MRQ to the memory management system 108.

The MBIST controller 110 may trigger, by way of the MBIST request MRQ, the MBIST operation on the second secure memory element 104 for various purposes. In an embodiment, the MBIST controller 110 may trigger the MBIST operation to facilitate the error detection in the second secure memory element 104. Such an MBIST operation may be triggered periodically. In another embodiment, the MBIST controller 110 may be configured to receive a first trigger signal TR1 from the memory management system 108 and generate the MBIST request MRQ in response to the first trigger signal TR1. The memory management system 108 may be further configured to detect a real-time fault in the second secure memory element 104 during the first memory operation and generate the first trigger signal TR1 to determine whether the detected fault corresponds to a transient fault or a permanent fault. In yet another embodiment, the MBIST controller 110 may be configured to receive a second trigger signal TR2 from the memory management system 108 and generate the MBIST request MRQ in response to the second trigger signal TR2. The memory management system 108 may be further configured to generate the second trigger signal TR2 to mask a power profile associated with the second memory operation to be executed on the first secure memory element 102. The MBIST operation executed in such a scenario may be executed on all the locations of the second secure memory element 104 or a few locations in an iterative manner.

The memory management system 108 may be further configured to determine whether the MBIST operation is required for the second secure memory element 104 based on an operational state of the IC 100 at the time instance when the MBIST request MRQ is received. The operational state of the IC 100 may indicate whether critical operations are being executed on the first and second secure memory elements 102 and 104, whether a real-time fault is detected in the second secure memory element 104, whether the second secure memory element 104 is due for a periodic MBIST operation, whether the power profile associated with the memory operations being executed on the first secure memory element 102 is to be masked, or the like. The memory management system 108 may be further configured to validate the MBIST request MRQ based on the determination that the MBIST operation is required for the second secure memory element 104. The MBIST operation may be executed on the second secure memory element 104 exclusively based on the validation of the MBIST request MRQ. As the MBIST request MRQ is validated before the execution of the MBIST operation, the memory management system 108 protects the second secure memory element 104 from an attack (e.g., a denial-of-service attack). Further, the MBIST request MRQ may be received while the first memory operation is ongoing on the first and second secure memory elements 102 and 104. In such a scenario, the MBIST operation is executed on the second secure memory element 104 exclusively after the first memory operation is executed.

Execution of the MBIST operation may correspond to writing predefined data in a set of locations of the second secure memory element 104 and subsequently reading data from the set of locations. If the read data matches the written data, the set of locations is error-free. Conversely, if the read data is different from the written data, the set of locations has errors. The above-mentioned operations are repeated for all the locations of the second secure memory element 104. The execution of the MBIST operation thus corrupts the second secure memory element 104. As a result, after the execution of the second memory operation and the control operation (e.g., the MBIST operation), the memory management system 108 may be further configured to copy the reference data REF of the first secure memory element 102 to the second secure memory element 104 to maintain sanity of the second secure memory element 104.

The memory management system 108 may be further configured to generate result data RES that is indicative of a result of the MBIST operation. Further, the memory management system 108 may be configured to provide the result data RES to the MBIST controller 110. For the periodic MBIST operation, if the result data RES indicates that the second secure memory element 104 is faulty, the MBIST controller 110 may be further configured to determine a recovery operation to recover the second secure memory element 104. For the masking operation, the result data RES is discarded. Further, for the masking operation and for the periodic operation indicating that the second secure memory element 104 is fault-free, the memory management system 108 may be configured to execute the third memory operation on the first and second secure memory elements 102 and 104.

For the real-time fault, the result data RES may indicate whether the fault is a transient fault or a permanent fault. For example, if the result data RES indicates that the second secure memory element 104 is fault-free, the fault detected during the first memory operation is considered to be the transient fault. In such a scenario, the memory management system 108 may be further configured to execute the third memory operation on the first and second secure memory elements 102 and 104. Conversely, if the result data RES indicates that the second secure memory element 104 is faulty, the memory management system 108 may be further configured to disable the second secure memory element 104 and execute the third memory operation exclusively on the first secure memory element 102.

In both the aforementioned scenarios, the memory management system 108 may be further configured to determine a count associated with the fault and compare the count with a set of threshold ranges. The count may be incremented each time a similar fault is detected (e.g., for each detection). Each threshold range may be indicative of the severity level of the fault. Based on the comparison between the count and the set of threshold ranges, the memory management system 108 may be further configured to determine a recovery operation for at least one of the first and second secure memory elements 102 and 104. For a lower value of the count, the recovery operation may correspond to disabling the second secure memory element 104 and executing a repair operation on the second secure memory element 104. For a higher value of the count, the recovery operation may correspond to a reset of the second secure memory element 104, a reset of both the first and second secure memory elements 102 and 104, or a reset of the IC 100. In such a scenario, the memory management system 108 may be further configured to generate a reset signal RST. The memory management system 108 may be further coupled to the reset controller 112, and configured to provide the reset signal RST to the reset controller 112. The reset controller 112 may be configured to execute the reset operation based on the reset signal RST. Thus, the memory management system 108 provides a graded response to any fault instead of a default brute force response (e.g., an IC reset).

Fault Injection Operation:

When the control operation corresponds to the fault injection operation, the memory management system 108 may execute the fault injection operation on the second secure memory element 104, while the second memory operation is executed on the first secure memory element 102. To execute the fault injection operation, the memory management system 108 may be further configured to inject a target fault TF in the second secure memory element 104, execute a fourth memory operation on the second secure memory element 104, and determine whether the injected target fault TF is detected. The target fault TF may be injected by way of various fault injection techniques (e.g., by way of address lines associated with the second secure memory element 104). The target fault TF is injected to test the fault-detection functionality of the memory management system 108. When the target fault TF is accurately detected, it is determined that the fault-detection functionality is fault-free. Further, as the detected fault is an injected fault, a recovery operation for the target fault TF may be disabled. In other words, the memory management system 108 may be further configured to block any reset signals (such as the reset signal RST) to the reset controller 112. This ensures that the injected fault does not result in an undesired reaction in the IC 100. When the target fault TF is not detected, it is determined that the fault-detection functionality is faulty. In such a scenario, a core circuit (not shown) associated with the IC 100 may execute various recovery operations to recover the memory management system 108.

After the fault injection operation and the second memory operation are executed, the memory management system 108 may be further configured to copy the reference data REF of the first secure memory element 102 to the second secure memory element 104 to maintain sanity of the second secure memory element 104. Further, the memory management system 108 may be configured to execute the third memory operation on the first and second secure memory elements 102 and 104.

Dummy Operation:

When the control operation corresponds to the dummy operation, the memory management system 108 may execute the dummy operation on the second secure memory element 104, while the second memory operation is executed on the first secure memory element 102. The dummy operation may be executed to mask the power profile associated with the second memory operation. The dummy operation may correspond to any operation that may mask the power profile associated with the second memory operation. In an embodiment, the dummy operation corresponds to copying, while the second memory operation is being executed on the first secure memory element 102, the reference data REF of the first secure memory element 102 to the second secure memory element 104. In another embodiment, the dummy operation corresponds to a read access operation or a write access operation being executed on the second secure memory element 104. After the dummy operation and the second memory operation are executed, the memory management system 108 may be further configured to copy the reference data REF of the first secure memory element 102 to the second secure memory element 104 to maintain sanity of the second secure memory element 104. Further, the memory management system 108 may be configured to execute the third memory operation on the first and second secure memory elements 102 and 104.

The first through third memory operations are thus executed in the sequential manner and without any discontinuity. The memory management system 108 thus significantly reduces the downtime for the memory operations. Further, the reference data REF stored in the first secure memory element 102 is divided into a plurality of slices (not shown). In such a scenario, the memory management system 108 copies the reference data REF of the first secure memory element 102 to the second secure memory element 104 such that one slice of the plurality of slices is copied at a time instance, thereby further reducing the downtime.

The scope of the present disclosure is not limited to the control operation being executed on the second secure memory element 104. In various other embodiments, the control operation may similarly be executed on the first secure memory element 102 while a memory operation is being executed on the second secure memory element 104, without deviating from the scope of the present disclosure. The control operation may be executed on the first secure memory element 102 immediately after the execution on the second secure memory element 104 or based on a trigger. In such cases, for an MBIST operation, if a permanent fault is detected in both the first and second secure memory elements 102 and 104, the memory management system 108 may generate the reset signal RST for resetting the IC 100.

It is described that a single memory operation is executed in parallel to the control operation to make the description concise and clear and should not be considered a limitation of the present disclosure. In various other embodiments, multiple memory operations may be executed in parallel to the control operation, without deviating from the scope of the present disclosure. In such cases, after the control operation is executed, if any memory operation is ongoing, the copy operation may be executed exclusively after the ongoing memory operation is executed.

Although FIG. 1 describes that a single access request (e.g., the access request ARQ) is utilized for initiating three memory operations, the scope of the present disclosure is not limited to it. In various other embodiments, one access request may be generated for each memory operation, without deviating from the scope of the present disclosure.

Although not shown, the memory management system 108 may be further configured to generate and provide a response to the security initiator 106 after the execution of each of the first through third memory operations. If the memory operation corresponds to a read access operation, the response may include read data. Alternatively, if the memory operation corresponds to a write access operation, the response may include an acknowledgment.

The simultaneous execution of a single memory-control operation pair is described to make the description concise and clear. In various other embodiments, for one memory operation, the MBIST operation may be simultaneously executed, for another memory operation, the fault injection operation may be simultaneously executed, and for yet another memory operation, the dummy operation may be simultaneously executed.

Figure 2:
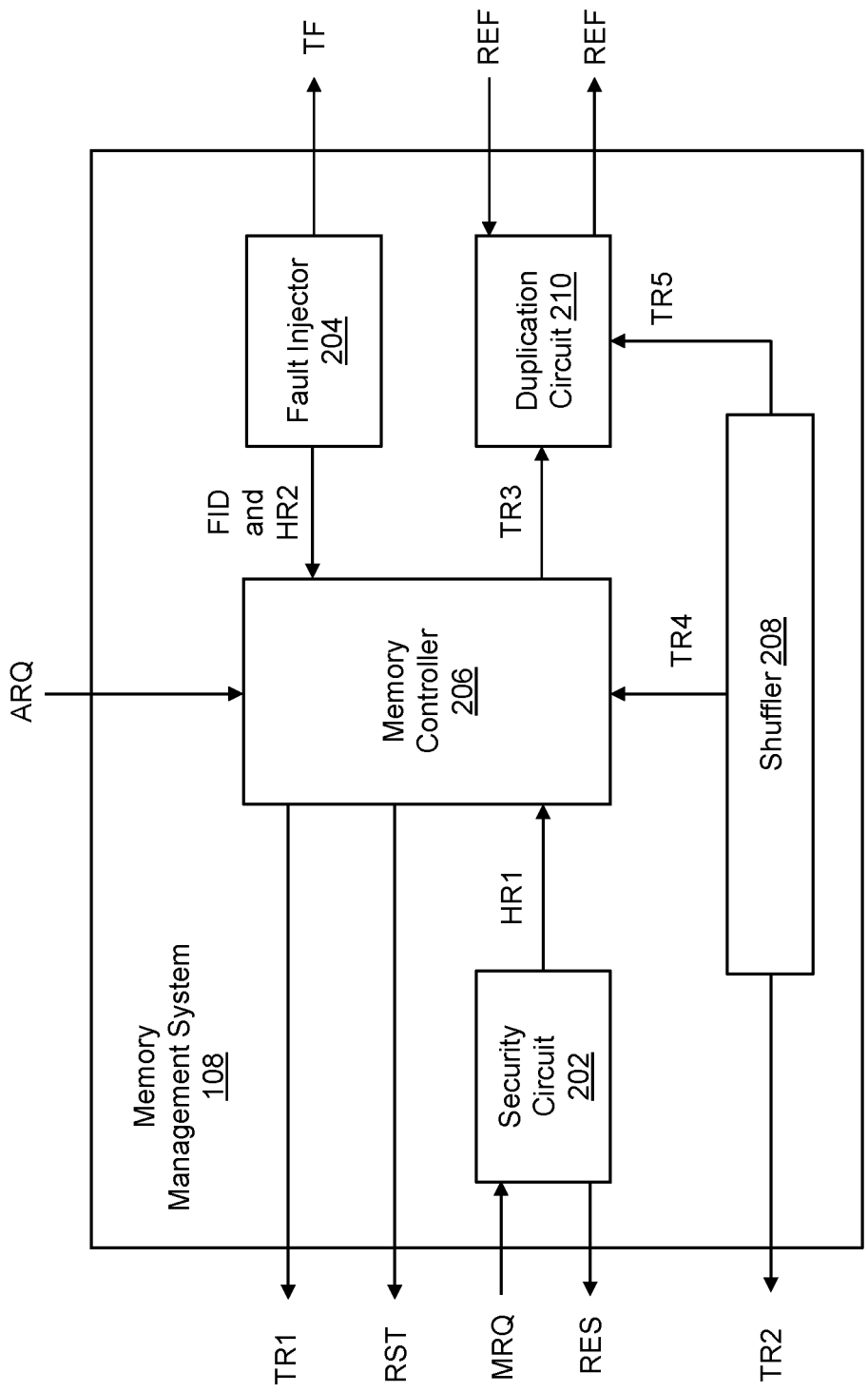
FIG. 2 illustrates a schematic block diagram of a memory management system of the IC of FIG. 1 in accordance with an embodiment of the present disclosure.

FIG. 2 illustrates a schematic block diagram of the memory management system 108 in accordance with an embodiment of the present disclosure. The memory management system 108 may include a security circuit 202, a fault injector 204, a memory controller 206, a shuffler 208, and a duplication circuit 210.

The security circuit 202 may be coupled to the MBIST controller 110, the memory controller 206, and the first and second secure memory elements 102 and 104. The security circuit 202 may include suitable circuitry that may be configured to perform one or more operations. For example, the security circuit 202 may be configured to receive the MBIST request MRQ from the MBIST controller 110 and validate that the MBIST request MRQ based on the operational state of the IC 100. The MBIST request MRQ may be received when the first memory operation is ongoing on the first and second secure memory elements 102 and 104. Thus, the MBIST operation may be gated until the first memory operation is executed. The validation and gating of the MBIST request MRQ prevent any data corruption in the second secure memory element 104 and filter out unplanned or unverified MBIST operations.

After the execution of the first memory operation, the security circuit 202 may be configured to generate a first halt request HR1 that is indicative of the execution of the MBIST operation on the second secure memory element 104, and provide the first halt request HR1 to the memory controller 206. The first halt request HR1 indicates to the memory controller 206 that the subsequent memory operation (e.g., the second memory operation) is to be executed exclusively on the first secure memory element 102. While the second memory operation is being executed on the first secure memory element 102, the security circuit 202 may be further configured to execute the MBIST operation on the second secure memory element 104. The security circuit 202 may be further configured to generate the result data RES based on the execution of the MBIST operation and provide the result data RES to the MBIST controller 110.

The fault injector 204 may be coupled to the first and second secure memory elements 102 and 104 and the memory controller 206. The fault injector 204 may include suitable circuitry that may be configured to perform one or more operations. For example, the fault injector 204 may be configured to inject the target fault TF in the second secure memory element 104. The target fault TF may be adjusted to test various aspects and situations which the memory controller 206 is expected to handle. Before the injection of the target fault TF, the fault injector 204 may be configured to generate and provide a second halt request HR2 to the memory controller 206. The second halt request HR2 may be similar to the first halt request HR1. Additionally, after the target fault TF is injected, the fault injector 204 may be configured to generate fault indication data FID that is indicative of the injection of the target fault TF in the second secure memory element 104 and provide the fault indication data FID to the memory controller 206.

The memory controller 206 may be coupled to the security circuit 202, the fault injector 204, the shuffler 208, the duplication circuit 210, and the first and second secure memory elements 102 and 104. The memory controller 206 may include suitable circuitry that may be configured to perform one or more operations. For example, the memory controller 206 may be configured to manage various memory operations and control operations that are to be executed on the first and second secure memory elements 102 and 104. The memory operations correspond to read access operations, write access operations, or the like, whereas the control operations correspond to MBIST operations, fault injection operations, and dummy operations.

The memory controller 206 may be configured to receive, from the security initiator 106, the access request ARQ for executing the first through third memory operations in the sequential manner. Initially, the memory controller 206 may be configured to execute the first memory operation on both the first and second secure memory elements 102 and 104. After the execution of the first memory operation, the memory controller 206 may be further configured to execute the second memory operation exclusively on the first secure memory element 102. In such a scenario, the control operation is simultaneously executed on the second secure memory element 104. The control operation may correspond to the MBIST operation, the fault injection operation, or the dummy operation. At least one of the error detection in the second secure memory element 104, the fault injection for the second secure memory element 104, and masking of the power profile associated with the second memory operation is enabled based on the control operation.

MBIST Operation:

When the control operation corresponds to the MBIST operation, the memory controller 206 may be further configured to receive the first halt request HR1 from the security circuit 202 after the first memory operation is executed. The memory controller 206 executes the second memory operation exclusively on the first secure memory element 102 based on the first halt request HR1. The MBIST operation may be triggered to facilitate periodic error detection in the second secure memory element 104 or to mask the power profile associated with the second memory operation. Alternatively, during the execution of the first memory operation, the memory controller 206 may be further configured to detect the real-time fault associated with the second secure memory element 104 and the MBIST operation may be triggered to determine whether the real-time fault corresponds to the transient fault or the permanent fault. In such a scenario, the memory controller 206 may be further configured to generate and provide the first trigger signal TR1 to the MBIST controller 110 to trigger the MBIST operation on the second secure memory element 104. The memory controller 206 may be further configured to determine whether the fault corresponds to the transient fault or the permanent fault based on the result of the MBIST operation (e.g., based on the result data RES). Further, after the execution of the second memory operation, the memory controller 206 may be configured to generate and provide a third trigger signal TR3 to the duplication circuit 210 to trigger the copy of the reference data REF from the first secure memory element 102 to the second secure memory element 104.

For the masking operation and for the periodic operation indicating that the second secure memory element 104 is fault-free, the memory controller 206 may be further configured to execute the third memory operation on both the first and second secure memory elements 102 and 104. Further, the memory controller 206 may be configured to execute the third memory operation on both the first and second secure memory elements 102 and 104 based on the real-time fault corresponding to the transient fault. Alternatively, based on the real-time fault corresponding to the permanent fault, the memory controller 206 may be further configured to disable the second secure memory element 104 and execute the third memory operation exclusively on the first secure memory element 102. The memory controller 206 may be further configured to determine the count associated with the real-time fault, compare the count with the set of threshold ranges, and determine the recovery operation for the real-time fault based on the comparison between the count and the set of threshold ranges. When the recovery operation corresponds to a reset operation, the memory controller 206 may be further configured to generate the reset signal RST and provide the reset signal RST to the reset controller 112.

Fault Injection Operation:

When the control operation corresponds to the fault injection operation, the memory controller 206 may be further configured to receive the second halt request HR2 from the fault injector 204 after the first memory operation is executed. The memory controller 206 executes the second memory operation exclusively on the first secure memory element 102 based on the second halt request HR2. Further, the memory controller 206 may be configured to receive the fault indication data FID, indicative of the target fault TF, from the fault injector 204. Based on the fault indication data FID, the memory controller 206 may be further configured to execute the fourth memory operation on the second secure memory element 104 and determine whether the injected fault (e.g., the target fault TF) is detected. The aforementioned operations may be executed while the second memory operation is executed on the first secure memory element 102. The fault-detection functionality of the memory controller 206 is tested based on the fault injection operation. As the fault is an injected fault, the recovery operation associated therewith is disabled. After the execution of the second memory operation and the fault injection operation, the memory controller 206 may be configured to provide the third trigger signal TR3 to the duplication circuit 210 to trigger the copy of the reference data REF from the first secure memory element 102 to the second secure memory element 104. Further, the memory controller 206 may be configured to execute the third memory operation on both the first and second secure memory elements 102 and 104.

Dummy Operation:

When the control operation corresponds to the dummy operation, the memory controller 206 may be further configured to receive a fourth trigger signal TR4 from the shuffler 208. Based on the fourth trigger signal TR4, the memory controller 206 may be further configured to execute, while the second memory operation is being executed on the first secure memory element 102, the dummy operation on the second secure memory element 104 to mask the power profile associated with the second memory operation. The dummy operation may correspond to the read access operation or the write access operation. For example, a dummy read or write access operation similar to the second memory operation but having a different address may be executed to mask the power profile associated with the second memory operation. Various other types of read or write access operations may be executed to mask the power profile associated with the second memory operation, without deviating from the scope of the present disclosure. After the execution of the second memory operation and the fault injection operation, the memory controller 206 may be configured to provide the third trigger signal TR3 to the duplication circuit 210 to trigger the copy of the reference data REF from the first secure memory element 102 to the second secure memory element 104. Further, the memory controller 206 may be configured to execute the third memory operation on both the first and second secure memory elements 102 and 104.

The shuffler 208 may be coupled to the memory controller 206, the duplication circuit 210, and the MBIST controller 110. The shuffler 208 may include suitable circuitry that may be configured to perform one or more operations. For example, the shuffler 208 may be configured to trigger various operations that mask the power profile associated with memory operations, thereby mitigating side-channel attacks. In one embodiment, the shuffler 208 may be configured to generate the second trigger signal TR2 for triggering the MBIST operation on the second secure memory element 104 and provide the second trigger signal TR2 to the MBIST controller 110. The power profile associated with the second memory operation being executed on the first secure memory element 102 is masked based on the execution of the MBIST operation on the second secure memory element 104. In another embodiment, the shuffler 208 may be configured to generate the fourth trigger signal TR4 for triggering the read or write access operation (e.g., the dummy operation) on the second secure memory element 104 and provide the fourth trigger signal TR4 to the memory controller 206. In yet another embodiment, the shuffler 208 may be configured to generate a fifth trigger signal TR5 for triggering the copy of the reference data REF from the first secure memory element 102 to the second secure memory element 104. The copying of the reference data REF of the first secure memory element 102 to the second secure memory element 104 corresponds to the dummy operation that masks the power profile associated with the second memory operation. The shuffler 208 thus generates the fifth trigger signal TR5 for triggering the dummy operation on the second secure memory element 104. Further, the shuffler 208 may be configured to provide the fifth trigger signal TR5 to the duplication circuit 210.

The shuffler 208 may be coupled to a randomizer (not shown). The randomizer may be configured to generate a select signal (not shown) and the shuffler 208 selects one of the various masking operations to mask the power profile associated with memory operations based on the select signal. In an embodiment, the randomizer corresponds to a true random number generator. The randomizer has high entropy that protects the shuffler 208 from any attack, thereby increasing the security of the IC 100.

The duplication circuit 210 may be coupled to the memory controller 206, the shuffler 208, and the first and second secure memory elements 102 and 104. The duplication circuit 210 may include suitable circuitry that may be configured to perform one or more operations. For example, the duplication circuit 210 may be configured to copy the reference data REF of the first secure memory element 102 to the second secure memory element 104. The duplication circuit 210 may execute the copy operation based on the third trigger signal TR3 received from the memory controller 206. In other words, the duplication circuit 210 may copy the reference data REF of the first secure memory element 102 to the second secure memory element 104 after the execution of the control operation and the second memory operation to maintain the sanity of the second secure memory element 104. Additionally, the duplication circuit 210 may execute the copy operation based on the fifth trigger signal TR5 received from the shuffler 208. In other words, the duplication circuit 210 may copy the reference data REF of the first secure memory element 102 to the second secure memory element 104 while the second memory operation is being executed on the first secure memory element 102 to mask the power profile associated with the second memory operation.

FIGS. 3A-3E, collectively, represents a flowchart 300 that illustrates a secure memory management method in accordance with an embodiment of the present disclosure. The secure memory management method corresponds to a method for managing one or more secure memories (e.g., the first and second secure memory elements 102 and 104) in the IC 100. The secure memory management method may be implemented by various components of the memory management system 108.

Figure 3A:
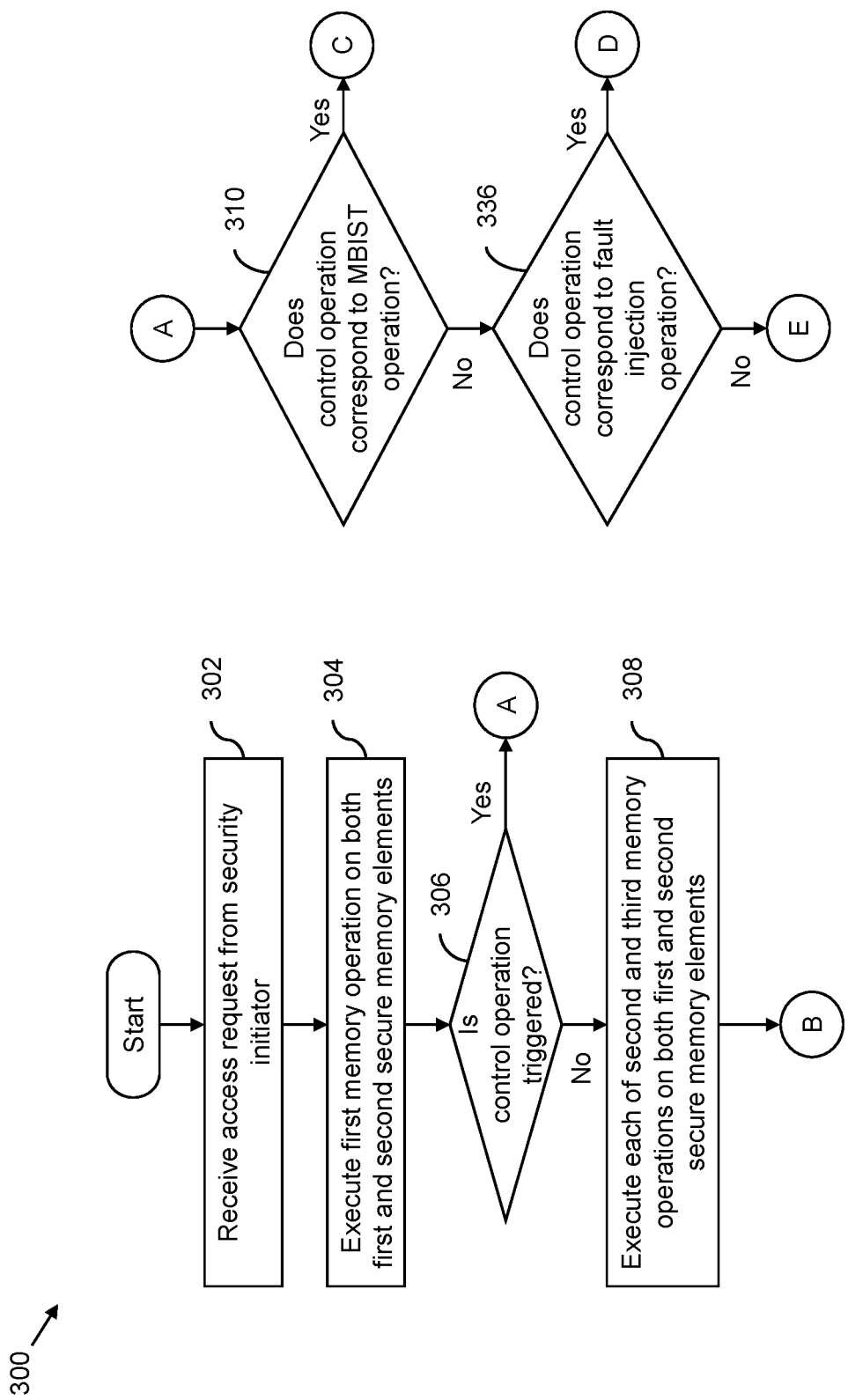
FIGS. 3A-3E, collectively, represents a flowchart that illustrates a secure memory management method in accordance with an embodiment of the present disclosure.

The security initiator 106 may generate the access request ARQ to initiate the first through third memory operations. Referring to FIG. 3A, at step 302, the memory controller 206 of the memory management system 108 may receive the access request ARQ from the security initiator 106. At step 304, the memory controller 206 may execute the first memory operation on both the first and second secure memory elements 102 and 104. At step 306, the memory controller 206 may determine whether the control operation is triggered. If at step 306, it is determined that the control operation is not triggered, step 308 is performed. At step 308, the memory controller 206 may execute each of the second and third memory operations on both the first and second secure memory elements 102 and 104.

If at step 306, it is determined that the control operation is triggered, step 310 is performed. At step 310, the memory controller 206 may determine whether the control operation corresponds to the MBIST operation. If at step 310, it is determined that the control operation corresponds to the MBIST operation, step 312 is performed.

Figure 3B:
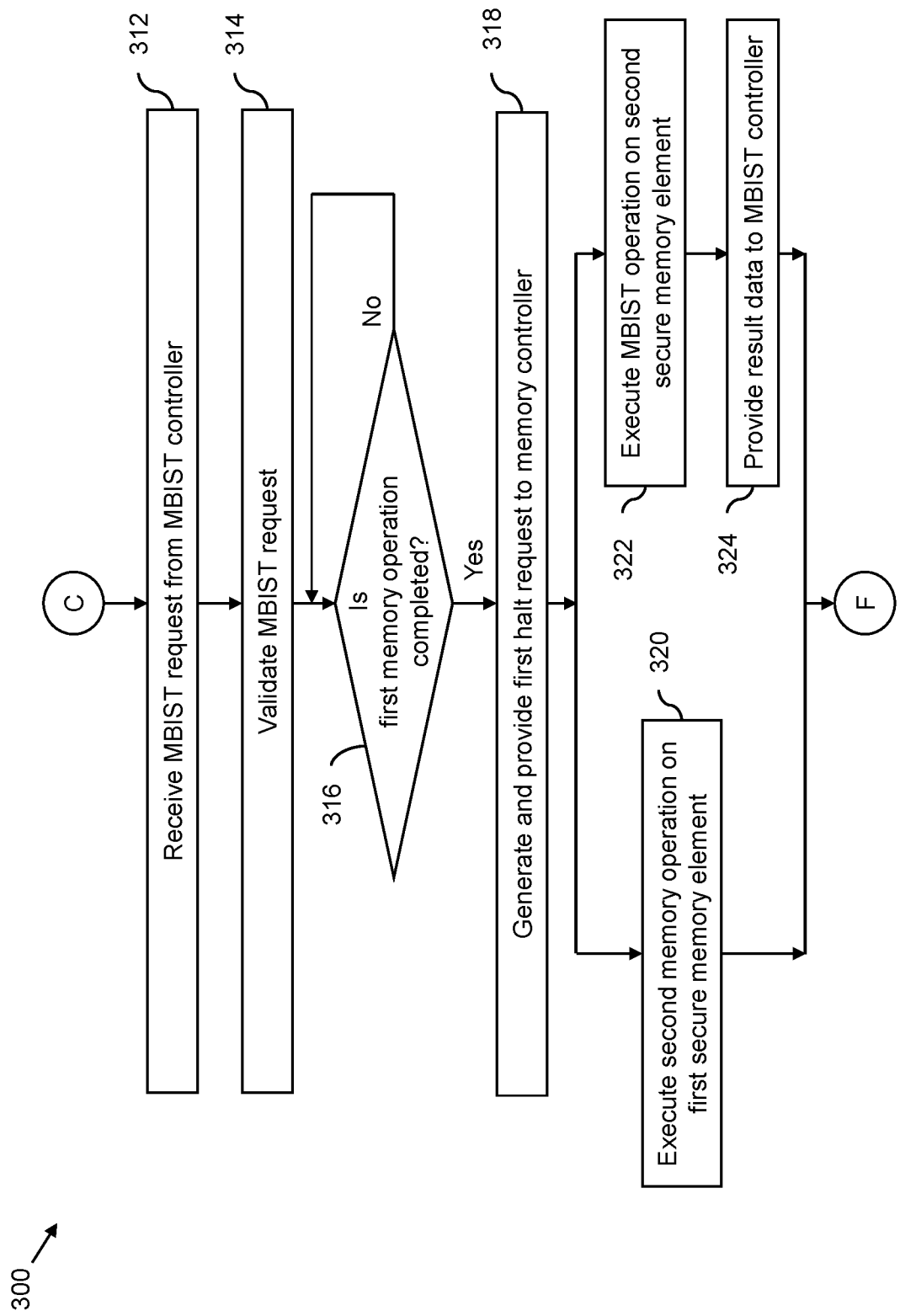

Referring to FIG. 3B, at step 312, the security circuit 202 of the memory management system 108 may receive the MBIST request MRQ from the MBIST controller 110. The MBIST controller 110 may generate the MBIST request MRQ for periodic error detection in the second secure memory element 104, based on the real-time fault detected in the second secure memory element 104, or to mask the power profile associated with the second memory operation to be executed on the first secure memory element 102. For the sake of the flowchart 300, it is assumed that the MBIST request MRQ is generated to determine whether the real-time fault detected in the second secure memory element 104 during the execution of the first memory operation is a transient fault or a permanent fault. At step 314, the security circuit 202 may validate the MBIST request MRQ based on the operational state of the IC 100.

At step 316, the security circuit 202 may determine whether the first memory operation is completed. If at step 316, the security circuit 202 determines that the first memory operation is ongoing, the security circuit 202 may wait for the first memory operation to be executed. If at step 316, the security circuit 202 determines that the first memory operation is completed, step 318 is performed. At step 318, the security circuit 202 may generate and provide the first halt request HR1 to the memory controller 206. At step 320, the memory controller 206 may execute the second memory operation on the first secure memory element 102. At step 322, the MBIST controller 110 may execute the MBIST operation on the second secure memory element 104. At step 324, the security circuit 202 may provide the result data RES, indicative of the result of the MBIST operation, to the MBIST controller 110. Steps 322 and 324 are performed simultaneously with step 320.

Figure 3C:
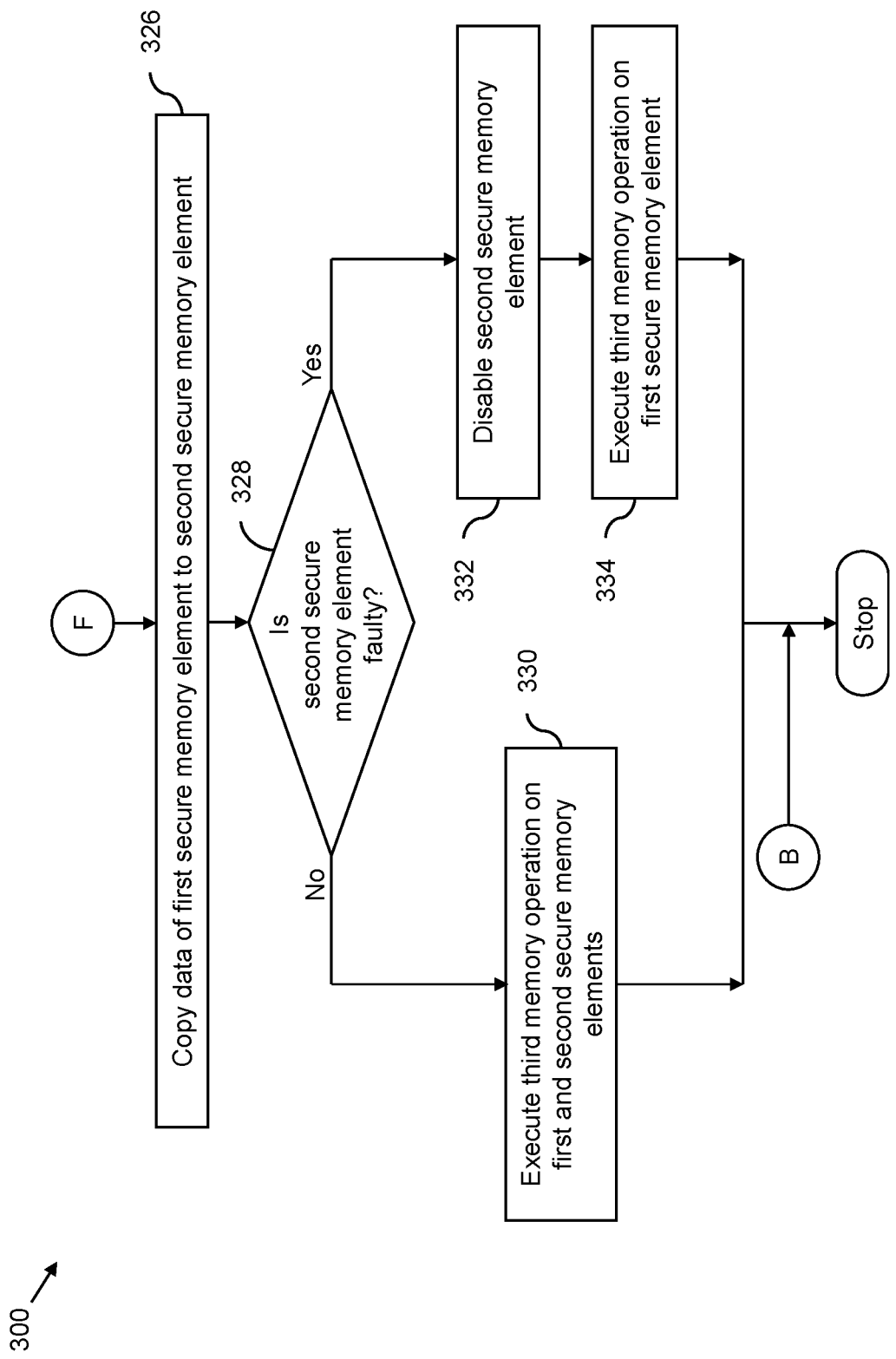

Referring to FIG. 3C, at step 326, the duplication circuit 210 of the memory management system 108 may copy the data (e.g., the reference data REF) of the first secure memory element 102 to the second secure memory element 104. At step 328, the memory controller 206 may determine whether the second secure memory element 104 is faulty. The memory controller 206 may determine whether the second secure memory element 104 is faulty based on the result of the MBIST operation on the second secure memory element 104 (e.g., based on the result data RES). The second secure memory element 104 may be faulty if the real-time fault corresponds to the permanent fault.

If at step 328, it is determined that the second secure memory element 104 is not faulty, step 330 is performed. At step 330, the memory controller 206 may execute the third memory operation on the first and second secure memory elements 102 and 104. If at step 328, it is determined that the second secure memory element 104 is faulty, step 332 is performed. At step 332, the memory controller 206 may disable the second secure memory element 104. At step 334, the memory controller 206 may execute the third memory operation on the first secure memory element 102.

Referring back to FIG. 3A, if at step 310, it is determined that the control operation does not correspond to the MBIST operation, step 336 is performed. At step 336, the memory controller 206 may determine if the control operation corresponds to the fault injection operation. If at step 336, it is determined that the control operation corresponds to the fault injection operation, step 338 is performed.

Figure 3D:
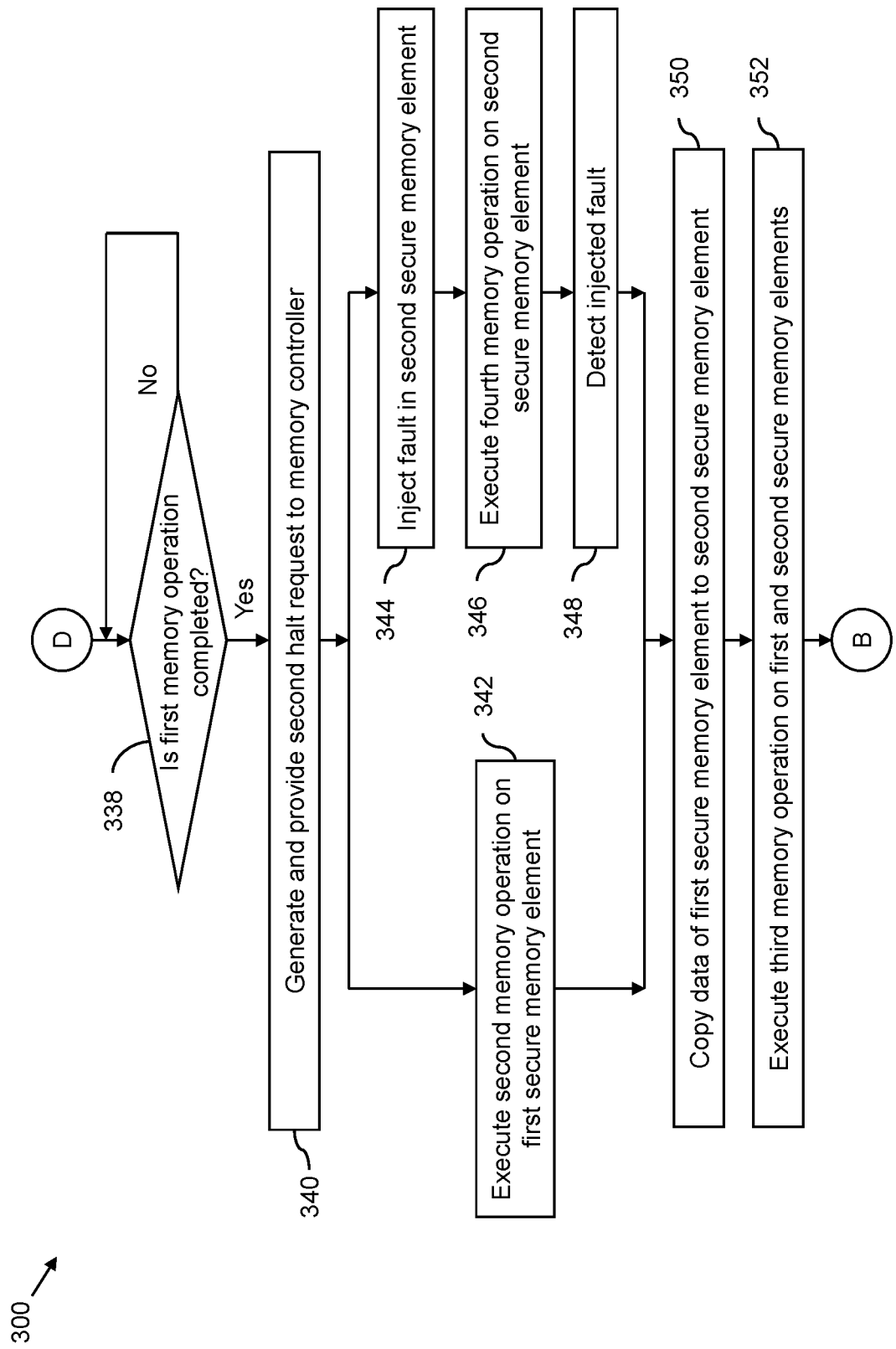

Referring to FIG. 3D, at step 338, the fault injector 204 of the memory management system 108 may determine whether the first memory operation is completed. If at step 338, it is determined that the first memory operation is ongoing, the fault injector 204 may wait for the first memory operation to be executed. If at step 338, it is determined that the first memory operation is completed, step 340 is performed. At step 340, the fault injector 204 may generate and provide the second halt request HR2 to the memory controller 206. At step 342, the memory controller 206 may execute the second memory operation on the first secure memory element 102. At step 344, the fault injector 204 may inject the target fault TF in the second secure memory element 104. At step 346, the memory controller 206 may execute the fourth memory operation on the second secure memory element 104. At step 348, the memory controller 206 may detect the injected fault (e.g., the target fault TF) on the second secure memory element 104. Steps 344-348 correspond to the fault injection operation and are performed simultaneously with step 342. At step 350, the duplication circuit 210 may copy the data (e.g., the reference data REF) of the first secure memory element 102 to the second secure memory element 104. At step 352, the memory controller 206 may execute the third memory operation on the first and second secure memory elements 102 and 104.

Figure 3E:
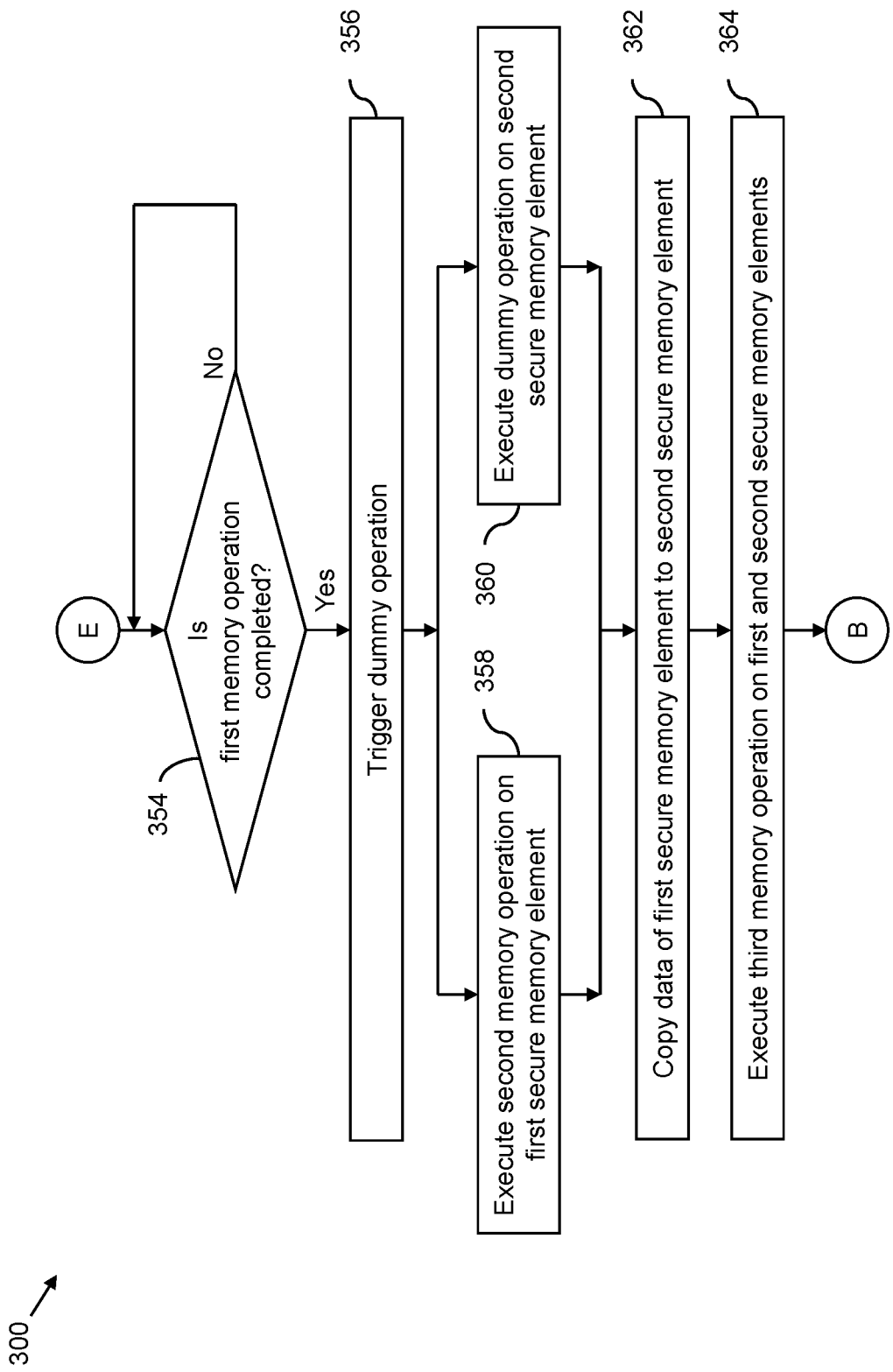

Referring back to FIG. 3A, if at step 336, it is determined that the control operation does not correspond to the fault injection operation (e.g., it is determined that the control operation corresponds to the dummy operation), step 354 is performed. Referring to FIG. 3E, at step 354, the shuffler 208 of the memory management system 108 may determine whether the first memory operation is completed. If at step 354, it is determined that the first memory operation is ongoing, the shuffler 208 may wait for the first memory operation to be executed. If at step 354, it is determined that the first memory operation is completed, step 356 is performed. At step 356, the shuffler 208 may trigger the dummy operation on the second secure memory element 104. The triggering of the dummy operation may correspond to the generation of a trigger signal (e.g., the fourth or fifth trigger signal TR4 or TR5) and the provision of the trigger signal to the memory controller 206 or the duplication circuit 210. If the memory controller 206 is triggered to execute the dummy operation, the third trigger signal TR3 further indicates that the second memory operation is to be executed exclusively on the first secure memory element 102. Alternatively, if the duplication circuit 210 is triggered to execute the dummy operation, the shuffler 208 may additionally provide, to the memory controller 206, a third halt request (not shown) indicative of the execution of the second memory operation exclusively on the first secure memory element 102.

At step 358, the memory controller 206 may execute the second memory operation on the first secure memory element 102. At step 360, the memory controller 206 or the duplication circuit 210 may execute the dummy operation on the second secure memory element 104. Steps 358 and 360 may be executed simultaneously. At step 362, the duplication circuit 210 may copy the data (e.g., the reference data REF) of the first secure memory element 102 to the second secure memory element 104. At step 364, the memory controller 206 may execute the third memory operation on the first and second secure memory elements 102 and 104.

In the present disclosure, when the control operation is to be executed, the execution of the memory operations is not halted. Additionally, after the control operation, the sanity of the secure memory element (e.g., the second secure memory element 104) is maintained. As a result, the downtime for the memory operations in the memory management system 108 is significantly less than that in a conventional memory management system. The reduced downtime is further indicative of increased system availability and utilization in the IC 100. Further, the MBIST operation is executed exclusively after validation. As a result, a denial-of-service attack, by way of the MBIST operation, on the secure memory element is prevented. Additionally, the power profile associated with the memory operation is masked using the MBIST operation or the dummy operation to mitigate side-channel attacks. The security of the IC 100 is thus significantly greater than that of an IC including the conventional memory management system. Further, in the memory management system 108, for a real-time fault, a recovery operation is determined based on the severity of the fault instead of utilizing an IC reset as the default response. This further reduces the downtime for the memory operations. Additionally, the fault-detection functionality of the memory management system 108 is tested by way of the fault injection operation. Thus, the reliability of the memory management system 108 is significantly greater than that of the conventional memory management system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. An integrated circuit (IC), comprising:
a first secure memory element and a second secure memory element that are configured to store identical security-related data; and
a memory management system that is coupled to the first secure memory element and the second secure memory element, and configured to:
execute a first memory operation on the first secure memory element, wherein the first memory operation facilitates execution of a security operation based on the security-related data stored in the first secure memory element;
execute, while the first memory operation is being executed on the first secure memory element, a control operation on the second secure memory element, wherein the control operation is associated with safety of the IC;
copy, after the execution of the first memory operation and the control operation, the data stored in the first secure memory element to the second secure memory element, and
execute a security operation based on the data copied in the second secure memory element and a control operation associated with safety of the IC on the first secure memory element after copying the data.

2. The IC of claim 1, wherein the control operation corresponds to at least one of a group consisting of (i) error detection in the second secure memory element, (ii) fault injection for the second secure memory element, and (iii) masking of a power profile associated with the first memory operation based on the control operation.

3. The IC of claim 1, wherein the control operation corresponds to one of a group consisting of (i) a memory built-in self-test (MBIST) operation, (ii) a fault injection operation, and (iii) a dummy operation, wherein the MBIST operation enables error detection in the second secure memory element and masking of a power profile associated with the first memory operation, wherein the fault injection operation enables fault injection for the second secure memory element, and wherein the dummy operation enables the masking of the power profile associated with the first memory operation.

4. The IC of claim 1, wherein the control operation corresponds to an MBIST operation that enables error detection in the second secure memory element and masking of a power profile associated with the first memory operation, wherein the memory management system is further configured to receive an MBIST request for the MBIST operation on the second secure memory element and validate the MBIST request, and wherein the MBIST operation is executed on the second secure memory element based on the validation of the MBIST request.

5. The IC of claim 4, further comprising an MBIST controller that is coupled to the memory management system, and configured to generate the MBIST request to initiate the MBIST operation on the second secure memory element and provide the MBIST request to the memory management system, wherein based on the execution of the MBIST operation, the memory management system is further configured to provide result data, indicative of a result of the MBIST operation, to the MBIST controller.

6. The IC of claim 4, wherein the memory management system is further configured to determine whether the MBIST operation is required for the second secure memory element based on an operational state of the IC when the MBIST request is received, and wherein the MBIST request is validated based on the determination that the MBIST operation is required for the second secure memory element.

7. The IC of claim 4, wherein the memory management system comprises:
 a memory controller that is coupled to the first secure memory element, and configured to execute the first memory operation on the first secure memory element;
 a security circuit that is coupled to the second secure memory element, and configured to (i) receive the MBIST request, (ii) validate the MBIST request, and (iii) execute, based on the validation of the MBIST request, the MBIST operation on the second secure memory element, wherein the security circuit executes the MBIST operation on the second secure memory element while the memory controller is executing the first memory operation on the first secure memory element; and
 a duplication circuit that is coupled to the first secure memory element and the second secure memory element, and configured to copy, after the execution of the MBIST operation and the first memory operation, the data of the first secure memory element to the second secure memory element.

8. The IC of claim 7, wherein the memory controller is further coupled to the second secure memory element and the security circuit, wherein the memory controller is further configured to execute a second memory operation on the first secure memory element and the second secure memory element, wherein the MBIST request is received by the security circuit while the memory controller is executing the second memory operation, and the security circuit executes the MBIST operation on the second secure memory element after the second memory operation is executed, wherein after the second memory operation is executed, the memory controller is further configured to receive, from the security circuit, a halt request that is indicative of the execution of the MBIST operation on the second secure memory element, and wherein the memory controller executes the first memory operation exclusively on the first secure memory element based on the halt request.

9. The IC of claim 4, wherein the memory management system comprises a memory controller that is coupled to the first secure memory element and the second secure memory element, and configured to detect a fault associated with the second secure memory element, and determine whether the fault corresponds to one of a group consisting of a transient fault and a permanent fault, wherein based on the fault corresponding to the transient fault, the memory controller is further configured to execute a third memory operation on the first secure memory element and the second secure memory element, and wherein based on the fault corresponding to the permanent fault, the memory controller is further configured to disable the second secure memory element and execute the third memory operation exclusively on the first secure memory element.

10. The IC of claim 9, wherein the memory controller is further configured to generate a trigger signal for triggering the MBIST operation on the second secure memory element, and wherein the memory controller determines whether the fault corresponds to one of the group consisting of the transient fault and the permanent fault based on a result of the MBIST operation.

11. The IC of claim 9, wherein the memory controller is further configured to determine a count associated with the fault and compare the count with a set of threshold ranges, wherein the count is incremented for each detection, wherein each threshold range is indicative of a severity level associated with the fault, and wherein based on the comparison between the count and the set of threshold ranges, the memory controller is further configured to determine a recovery operation for the fault.

12. The IC of claim 4, wherein the memory management system comprises a shuffler that is configured to generate a trigger signal for triggering the MBIST operation on the second secure memory element, and wherein the power profile associated with the first memory operation being executed on the first secure memory element is masked based on the execution of the MBIST operation on the second secure memory element.

13. The IC of claim 1, wherein the control operation corresponds to a fault injection operation that enables fault injection for the second secure memory element, wherein to execute the fault injection operation, the memory management system is further configured to (i) inject a fault in the second secure memory element, (ii) execute a fourth memory operation on the second secure memory element, and (iii) determine whether the injected fault is detected, and wherein when the injected fault is detected, a recovery operation for the injected fault is disabled.

14. The IC of claim 13, wherein the memory management system comprises:
 a fault injector that is coupled to the second secure memory element, and configured to inject the fault in the second secure memory element;
 a memory controller that is coupled to the fault injector, the first secure memory element, and the second secure memory element, wherein the memory controller is configured to execute the first memory operation on the first secure memory element, and wherein while the first memory operation is being executed on the first secure memory element, the memory controller is further configured to execute the fourth memory operation on the second secure memory element and determine whether the injected fault is detected; and a duplication circuit that is coupled to the first secure memory element and the second secure memory element, and configured to copy, after the execution of the fault injection operation and the first memory operation, the data of the first secure memory element to the second secure memory element.

15. The IC of claim 1, wherein the control operation corresponds to a dummy operation that enables masking of a power profile associated with the first memory operation, wherein the memory management system comprises a memory controller that is coupled to the first secure memory element, and configured to execute the first memory operation on the first secure memory element, wherein the memory controller is further coupled to the second secure memory element, and configured to execute, while the first memory operation is being executed on the first secure memory element, the dummy operation on the second secure memory element to mask the power profile associated with the first memory operation, and wherein the dummy operation corresponds to one of a group consisting of a read access operation and a write access operation.

16. The IC of claim 15, wherein the memory management system further comprises a shuffler that is configured to generate a trigger signal for triggering the dummy operation and provide the trigger signal to the memory controller, and wherein the memory controller executes the dummy operation based on the trigger signal.

17. The IC of claim 1,
wherein the control operation corresponds to a dummy operation that enables masking of a power profile associated with the first memory operation,
wherein the memory management system comprises:
a memory controller that is coupled to the first secure memory element, and configured to execute the first memory operation on the first secure memory element; and
a duplication circuit that is coupled to the first secure memory element and the second secure memory element, and configured to copy, while the first memory operation is being executed on the first secure memory element, the data of the first secure memory element to the second secure memory element to mask the power profile associated with the first memory operation, and
wherein the copying of the data of the first secure memory element to the second secure memory element corresponds to the dummy operation.

18. The IC of claim 17, wherein the memory management system further comprises a shuffler that is configured to generate a trigger signal for triggering the dummy operation on the second secure memory element, and provide the trigger signal to the duplication circuit, and wherein the duplication circuit copies the data of the first secure memory element to the second secure memory element based on the trigger signal.

19. The IC of claim 1, wherein the data stored in the first secure memory element is divided into a plurality of slices, and wherein the memory management system copies the plurality of slices of the first secure memory element to the second secure memory element one at a time.

20. A secure memory management method, comprising:
executing, by a memory management system, a first memory operation on a first secure memory element wherein the first memory operation facilitates execution of a security operation based on security-related data stored in the first secure memory element;
executing, by the memory management system, while the first memory operation is being executed on the first secure memory element, a control operation on the second secure memory element, wherein identical security-related data is stored in the first secure memory element and the second secure memory element, and wherein the control operation is associated with safety of the IC; and
copying, by the memory management system, after the execution of the first memory operation and the control operation, the data stored in the first secure memory element to the second secure memory element; and
executing a security operation based on the data copied in the second secure memory element and a control operation associated with safety of the IC on the first secure memory element after copying the data.

* * * * *